United States Patent [19]

Volkrodt

[11] 4,399,382
[45] Aug. 16, 1983

[54] ELECTRICAL MACHINE

[76] Inventor: Wolfgang Volkrodt, No. 8, Waldsiedlung, 8740 Bad Neustadt, Fed. Rep. of Germany

[21] Appl. No.: 277,452

[22] Filed: Jun. 25, 1981

[30] Foreign Application Priority Data

Jul. 16, 1980 [DE] Fed. Rep. of Germany ....... 3026892

[51] Int. Cl.³ .............................................. H02K 1/00
[52] U.S. Cl. ...................................... 310/216; 310/62; 310/89; 310/259
[58] Field of Search ....................... 310/58, 59, 62, 63, 310/64, 65, 55–57, 52, 53, 71, 42, 89, 91, 216, 217, 254, 255, 258, 259, 260, 90, 89; 336/211, 212, 217, 233

[56] References Cited

U.S. PATENT DOCUMENTS

| | | | |
|---|---|---|---|
| 1,156,639 | 10/1915 | Starker | 310/258 |
| 1,158,495 | 11/1915 | Hellmund | 310/258 |
| 1,882,487 | 10/1932 | Dupont | 310/217 |
| 1,898,489 | 2/1933 | Kieffer | 310/217 |
| 2,783,398 | 2/1957 | Hass | 310/58 |
| 3,171,996 | 3/1965 | Alger | 310/64 |
| 3,501,660 | 3/1970 | Wightman | 310/91 |
| 3,822,389 | 7/1974 | Kudlacik | 310/53 |
| 3,858,067 | 12/1974 | Otto | 310/258 |
| 4,181,393 | 1/1980 | Lill | 310/71 |
| 4,217,514 | 10/1980 | Simazaki | 310/260 |

*Primary Examiner*—R. Skudy
*Attorney, Agent, or Firm*—John C. Smith, Jr.

[57] ABSTRACT

An electrical machine is provided which consists of a stator made up of stacks of plates and a rotor mounted at the ends of the machine in bearing plates and rotatable in the stator. The stator plates, which are asymmetrically designed so that one part has an arcuate outline corresponding to a circular stator contour while the opposite part has a rectangular contour with an arcuate separating line extending as far as possible into the described outline when the plates are being stamped from strip material, are arranged in respective separate stacks situated on one another, multiples of 90° apart, in order to form a self-supporting stator.

7 Claims, 9 Drawing Figures

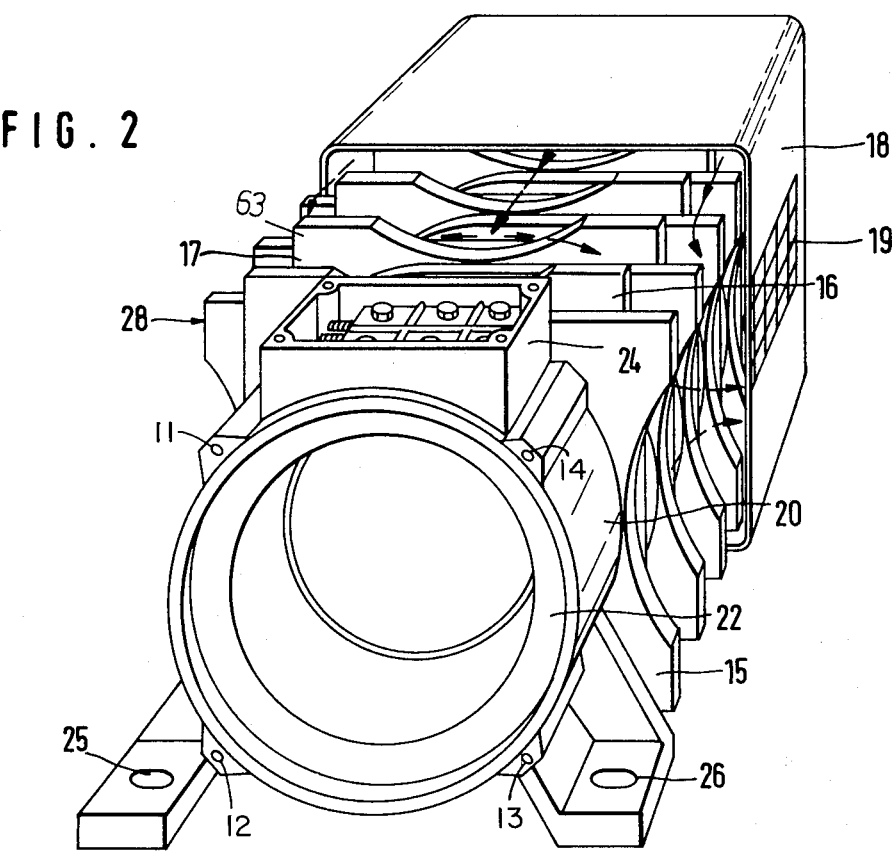
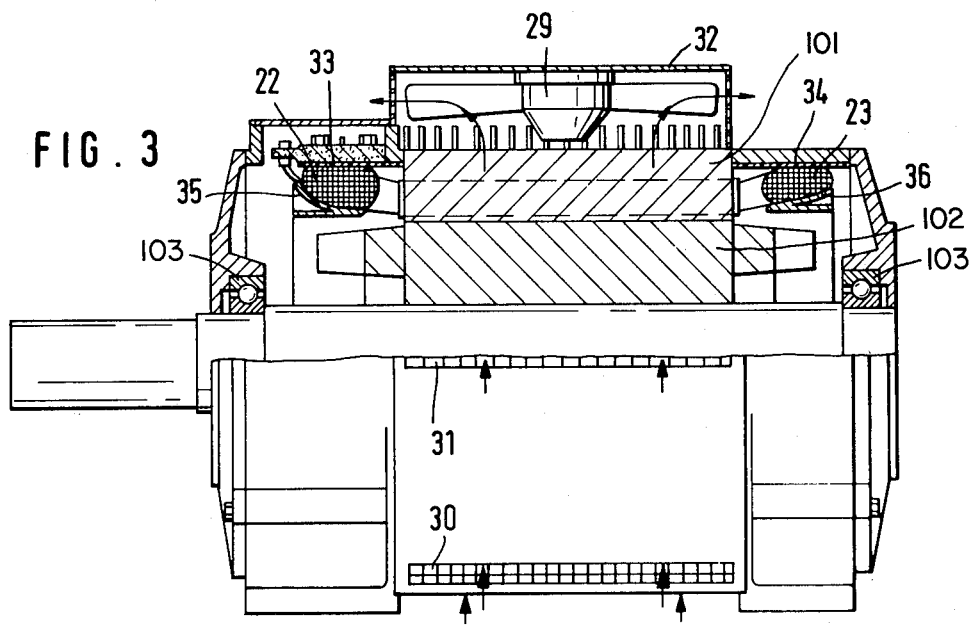

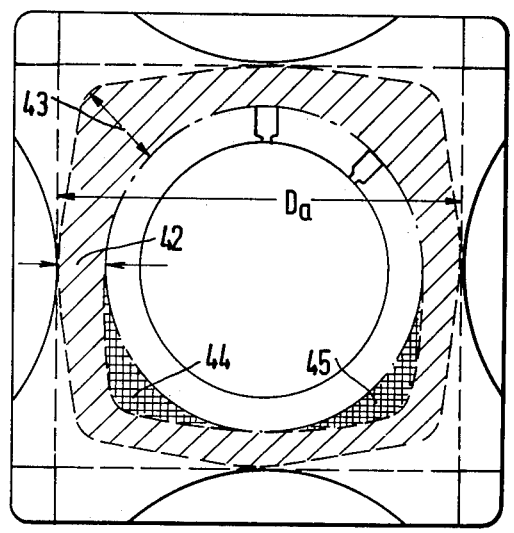
FIG. 4
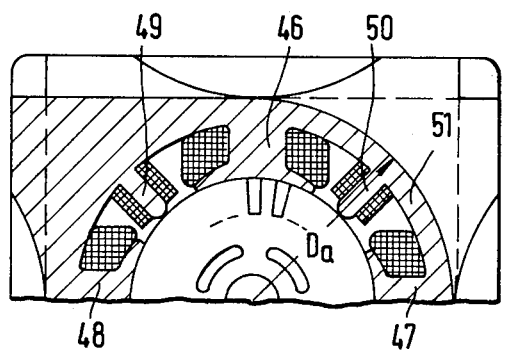
FIG. 5
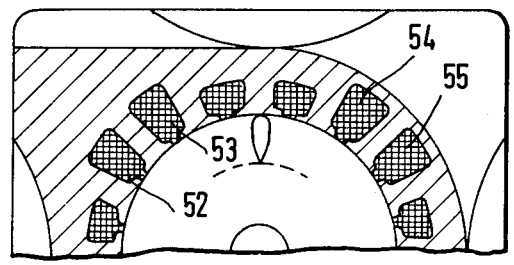
FIG. 6
FIG. 7

ELECTRICAL MACHINE

BACKGROUND OF THE INVENTION

This invention relates to an electrical machine consisting of a stator, which is made up of stacks of plates rotated into mutually offset positions and provided with axial channels, and of a rotor mounted on the ends of the machine and rotatable in the stator.

As the rotating internal rotor of electrical machines is round it is appropriate that the external diameter of the stator likewise, and not only the boring of the stator, should be made circular. In order to limit the eddy current losses the stator plates of rotary field machines are stamped out of sheet or strip metal and then combined to form a stack. At the present stage of technical progress the difference between the square containing the circular piece and this latter itself, i.e. 21% of the electric sheet, has to be scrapped, then having only about 5% of the original value of the material. Energy has to be consumed in the re-melting and further processing of the scrap.

As the conversion of electrical energy into mechanical energy and vice versa causes losses which heat up the machine and may cause the electrical insulation to burn out, measures have to be taken to ensure the effective dissipation of heat losses. At the present time this is done, in the case of surface-cooled machines, by means of housings which have numerous axial cooling ribs and over which a current of air passes in the axial direction and which are made of light metal or grey cast iron, the cylindrical stacks of stator plates being pressed into these housings. Not only raw materials are required for the production of the housings but also a considerable amount of energy for the melting, casting and cutting. Rising raw material and energy prices now make it necessary to consider whether the present method of construction, particularly for closed surface-cooled electrical machines can still be regarded as satisfactory under modern conditions.

A type of stator stack has become known in which the stamping lattice remained on the stator plates and axial cooling channels were cut into the diagonals of the square stack. A further system is known in which plates stamped in this manner are stacked with a continuously adjusted angle of rotation, the spaces thus formed between the ribs being filled up with light metal or casting resin. This leads to variants, without housings, of the present-day machines with axial ribs. Owing to the fact that the axial cooling channels have to be punched out, however, there is still a considerable part of the present stamping lattice that has to end as scrap. The operation of punching out axial cooling channels does not by itself always have the desired effect. Neither does the surface of the axial channels dissipate the heat loss to a sufficient extent.

In a further type of electrical machine, particularly of the kind in which the machine shaft is horizontal and the heat loss is dissipated by natural convection, the stator plates are in separate stacks, some of them having the usual round contour and the rest having the shape of the surrounding square. Here again, over 10% of the electric sheet used has to be scrapped.

SUMMARY OF THE INVENTION

It is, therefore, an object of the present invention to reduce the proportion of scrap still further and also to enable the electric sheet left on the round units to be utilized for the dissipation of heat loss, for the magnetic circuit and for the purpose of reducing the iron losses and ventilator losses.

A further object of the present invention is to enable the supporting housing on the periphery of the stator stack to be dispensed with altogether.

To attain this object the present invention provides an electrical machine, comprising a stator made up of stacks of plates rotated into off-set positions in relation to one another and having axial channels, and a rotor on a machine shaft mounted on the ends of the electrical machine and rotatable in a bearing system in the stator, wherein the stator plates are asymmetrically designed so that one part has an arcuate outline corresponding to a circular stator contour while the opposite part has a rectangular contour with an arcuate separating line extending as far as possible into the described outline when the stator plates are being stamped from strip material, and are arranged in respective separate stacks situated on one another, multiples of 90° apart, in order to form a self-supporting stator, axial channels being formed in the diagonals in the sheet metal remaining on the stator yoke.

In contradistinction to the system in use hitherto the stamping lattice falling off in the stamping of the round units is not scrapped but is utilized for large-area rib channels through which cooling air passes tangentially to the diameter of the stator, for the reduction of ventilator and iron losses and as a part of the magnetic circuit. This method enables the system to be constructed without a housing and with housing rings mounted axially on the end faces of the stacks. The more compact structure adopted for the stator also enables the coil ends and terminal connections to be arranged differently from those of the conventional systems.

Technical and economic advantages are provided by the formation of tangential cooling channels, as these, based on a thickness of 0.5 mm, for the electric sheet, and on a suitable stratification for separate stacks having different and annularly offset contours, can provide very ample surfaces which dissipate the motor losses very effectively, requiring very little cooling air for the purpose and thus only low fan power.

Nowadays stator and rotor plates are usually stamped from strip-shaped electric sheets and by the sequential process. In this method the separating cut of two adjacent round units for the stator plate coincides with the tangent to the two discs in contact with each other. The solution provided by the present invention consists of a method in which the separating cut of two such adjacent stator plate discs does not pass through this tangent but extends to a considerable distance into the original stamping lattice of the preceding or subsequent disc.

Tangential cooling of stator stacks without housings, in which method the temperature gradient of several degrees between the stack and the housing pressed onto it is eliminated, enables the cooling air to be guided on a different principle from that adopted in the conventional axial cooling of ribbed housing with the fan situated on the side farther away from the driving system. Covered channels and thus a casing around the stator stack are required. If this casing is to be made of relatively thin sheet metal, it must be able to support itself, in order to prevent denting. From this point of view the solution provided by the invention, i.e. a separating cut between two discs which extends into the stamping lattice of the adjacent disc, provides a better means of supporting the casing than a separating cut constituting the tangent between two discs in contact with each other.

A stator stack built up by the above method, with a casing surrounding it, normally has a rectangular contour. With box-shaped electrical machines of this kind the space is utilized more efficiently than with the present round rib-cooled machines. Moreover, these box-shaped electrical machines can be stacked more easily for transport and storage purposes and are better adapted in their shape, from the point of view of appearance, to the rectangular structure of modern machine tools and other machinery.

The transition from the box-shaped stator stack to the bearing points of the rotor shaft calls for different technical solutions than in the case of the machines hitherto in use and having round housings at the ends of which the two bearing plates are fixed in centering devices. Either pot-shaped bearing plates or housing rings, these latter as a transition to the present dish-shaped bearing plates, have to be affixed to the end faces of the box-shaped stator.

Under these conditions it is of advantage for the coil ends to be pressed outwards against the inserts of insulating material and thus thermally coupled to the housing rings far more satisfactorily than if the former air-gap insulation for the coil ends were retained. In addition to a reduced temperature gradient between the coil end and the surface of the machine, the danger of hot points in the coil ends, e.g. if the rotor is blocked or takes a long time to run up to full speed, is reduced. This is of advantage inter alia when operating in plant subject to the danger of explosions.

With the compact structure for the stator of the machine, resulting from the invention, and when the coil ends are pressed against electrically insulated housing rings, the operation of soldering switch connections in the form of flexible conductors to the lead-in ends and then constricting these latter proves difficult. The invention proposes that over a very short distance the lead-in ends should be connected up to a terminal board accommodated in the housing ring, the undetachable cover of the terminal box at the same time containing the essential data, in the manner of a rating plate and circuit diagram, for the relevant winding and stack of plates.

The advantages obtainable with the present invention are once again listed below:

Reduction of the wastage of material hitherto involved in the stamping lattice, when the stator discs are being stamped, from about 20% to less than 5%;

Saving of the material for the housing over the length of the stator stack;

Reduction of the iron losses and magnetization currents, the flux of the magnetic yoke being diverted into the tangential cooling ribs, which have remained stationary;

Elimination of the additional losses which, in conventional machines, occur on the contact surface between the stator stack and the pressed-on housing as a result of the parallel short circuit between adjacent stator plates;

Elimination of the temperature gradient occurring in the transfer of the losses from the stack of stator plates to the surrounding housing;

By comparison with surface-cooled machines, in which the current of cooling air does not remain between the open rips, the air flowing through covered tangential channels is utilized for the dissipation of heat far more efficiently. The quantity of cooling air required is reduced to less than half, the power needed for the fan and thus the noise caused by it thus being likewise reduced;

Good mechanical support for the casing surrounding the rib channels;

Reduction of the temperature in the coil end, by the change-over from the former air-gap type of insulation to a thin insulation corresponding to the groove type, with coil ends pressed against housing rings;

Reduction of the danger of hot points in the coil ends by thermal adaptation to the heat capacity of the housing rings surrounding them;

The coil ends, being thus pressed against the housing rings, are secured more reliably against the electrodynamic and vibratory forces occurring than is possible with conventional constricted coil ends;

Saving of material and labor costs, by direct connection of the lead-in ends, without the use of cables, to the terminal board situated in the immediate vicinity of the coil end;

Machines according to the invention require about half as much space for stacking as round machines of the same power, owing to the quadrangular box-type structure, and at the same time are better adapted, from the point of view of appearance, to the present-day machine tools and other machinery, which are likewise more or less rectangular;

Possibility of constructing multi-width systems on economical lines, as the surface of the tangential cooling channels increases in strict proportion to the length of the stack, and the covered channels ensure that the cooling air will not be accidentally removed, as occurs with excessively long machines of the axially rib-cooled type. The change over in the case of 3-ph motors manufactured in large quantities, for instance, from the hitherto customary two stack length per stack diameter to the three-length system rendered possible by the invention increases by 50% the lot sizes for identical components dependent on the stack diameter and reduces by 33% the variety of tools required for stamping, finishing the centering devices of the housings and the bearing plates, die casting molds etc;

Elimination of expensive cooling methods, such as tubular cooling equipment or the liquid cooling process, in large-size machines in which housing rib cooling proves insufficient, the fact that the cooling surface increases in proportion to the active volume being a special characteristic of the invention. With the said large machines, therefore, it is no longer necessary to change over to other and more expensive cooling processes and/or to take steps to reduce the loss density in the active material.

BRIEF DESCRIPTION OF THE DRAWINGS

Some preferred embodiments of the invention will now be described by way of example and with reference to the accompanying schematic drawings in which:

FIG. 2 is a perspective view of a tangentially cooled stator stack;

FIG. 3 is a longitudinal section through a machine according to the invention;

FIG. 4 is a longitudinal sectional view, on an enlarged scale, of the connection of the lead-in ends to terminal board pins;

FIG. 5 is a representation of the propagation of the magnetic flux in the tangential ribs;

FIG. 6 is a section through half the lamination for an enclosed four-pole surface-cooled D.C. machine and shows the additional active material gained;

FIG. 7 is a representation similar to that shown in FIG. 6, but in the case of single-phase motors with an auxiliary phase, according to the invention;

DESCRIPTION OF THE PREFERRED EMBODIMENTS

Figure 1:
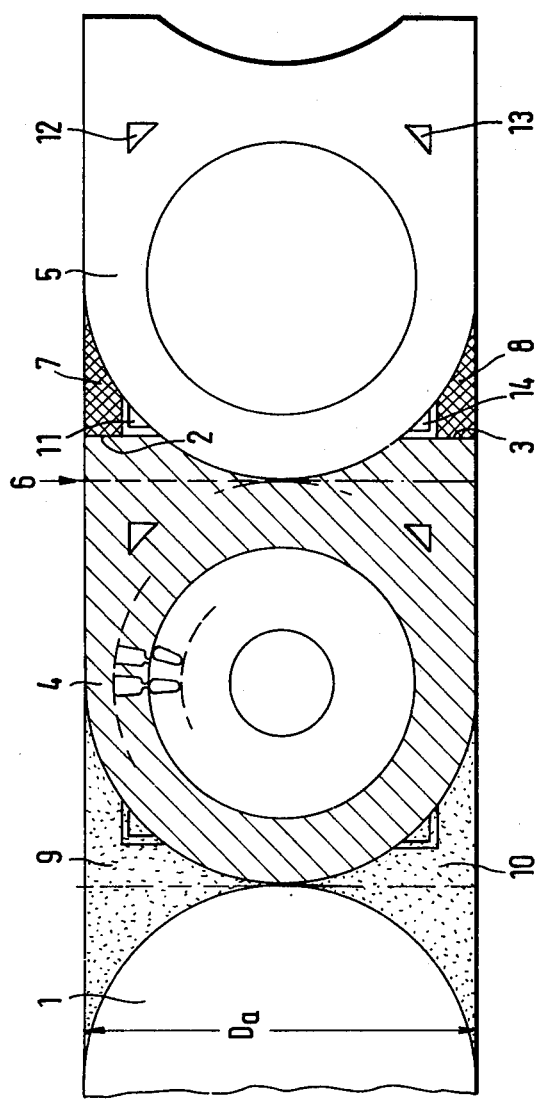
FIG. 1 shows a contour of sheet steel lamination in the sequential stamping of stator plates of a machine according to the invention.

FIG. 1 shows a stamping lattice of a machine according to the invention in the case of the sequential cutting process. The strip of electric sheet metal 1 fed to the stamping punch is of the same width as the active stack diameter $D_a$. The separating cut 2, 3 between two stator plates 4 and 5 is not on the tangent 6 common to the two discs. The slanting hatching on the left stator plate 4 in FIG. 1 shows how much of the strip metal material is used in the electrical machine. Wastage only occurs in the gussets 7 and 8 marked with close criss-cross hatching. Hitherto the part remaining between the disc with $D_a$ as diameter and the surrounding square was likewise wasted—see the dotted parts marked 9 and 10. In the example illustrated one of the factors governing the position of the separating cut is the requirement that all stacked stator plates off-set by an angle of 90° and by a multiple thereof are to form in the diagonals four common channels 11, 12, 13 and 14. They serve either as a passage for a tie rod by which the stack is held together, as functionally equal die casting channels (see FIG. 2) or as axial channels for circulating air for the internal circuit.

FIG. 2 shows, with separate stacks farther apart than is actually the case in practice, how by continuous rotation of separate stacks of stator plates 15, 16 and 17 through an angle of 90° cooling channels are produced, together with cooling ribs 63 delimiting the said channels, with an ample surface, the continually changing contour also ensuring considerable air turbulence. By comparison with the conventional rib-cooling, in which the axial current of air is hardly subjected to any turbulence on its way through the open rib channels, besides being deflected to the outside shortly after emerging from the fan cover, the present system provides heat dissipation coefficients over twice as high. The structure according to the invention thus considerably reduces the quantities of cooling air and the fan power required, as well as the noise produced, for the reliable dissipation of the heat loss. A sheet metal casing 18 serves to guide the air and rests on all sides on the separate stacks, which form a perforated square. Arrows have been used to indicate the assumed traject of the air, starting from the end of the machine and proceeding tangentially to the active diameter $D_a$ and finally emerging from perforations 19 in the casing 18.

With a constant distance, e.g. 5 mm, between adjacent stacks of tangential ribs the surface of the ribs increases in proportion to $D_a^2$ and at the same time in proportion to the length l of the stator stack and thus in proportion to the active volume $D_a^2 l$. With the surface-cooled and draught-ventilated machines at present customary, however, the cooling surfaces only increase approximately in proportion to $D_a l$, as result of which the heat loss dissipation becomes increasingly critical with the increase in the size of the machine, necessitating the adoption of different cooling processes, such as tubular cooling or liquid cooling. With tangential cooling, on the other hand, with a diameter $D_a$ of 100 cm, for instance, the depth obtained from the cooling channel, as measured in the diagonal from the surrounding casing to the base of the rib on the active diameter $D_a$, is about 30 cm. Conventional ventilating systems, in which the fan is mounted on one end of a motor shaft, for example, are over-strained in being required, after the originally axial emergence of the current of air from the fan cover and after a deflection of 90°, to effect the efficient ventilation of such channels, which may be about 30 cm deep and 0.5 cm wide. In such cases the use of extraneous coolers is more advantageous, as the direction in which they move the air coincides with the tangential lamination of the stack of stator plates. If the electrical machine is only operated at part-load, the flue effect in the tangential channels is already sufficient for the dissipation of heat loss. As in the case of modern car radiator systems it is desirable for the extraneous cooler not to be switched on by a thermostat until the winding temperature is approaching certain limit values. By comparison with conventional fans, rigidly mounted on the rotor shaft, and providing an unsatisfactory degree of efficiency when dimensioned for both directions of rotation, the present system not only enables a noticeable saving of energy to be obtained but also reduces the noise which accompanies the operation of large-size machines and which is often hardly tolerable.

FIG. 2 also shows how, with the use of the die casting technique, the process of holding the stack of stator plates together by diagonal die casting channels can be combined in one operation with the formation of housing rings, one of which rings 20 is shown, coil ends 22 and 23, one of which coil ends 22 is shown resting against the insides of the latter, and the attachment, by casting, of a terminal box 24 and four feet, two of which feet 25,26 are shown.

FIG. 3 shows a machine according to the invention comprising a stator 101, a rotor 102 and bearings 103 at opposite ends of the stator rotatably supporting the rotor and in which an external rotary fan 29 in a fan housing 32 takes in the cooling air by suction from below, with the partial admixture of cool live air from the side, through perforations 30 and 31 in the casing, then expelling it sideways from the fan housing 32. The coil ends 22 and 23 are in this case pressed against an insulation 33 and 34 of the housing rings by the aid of pressure rings 35 and 36.

FIG. 4 shows how lead-in ends 37, bunched together by an insulating sheath 38, are connected up to side bolts 39 of a terminal board 40. This operation is carried out when the terminal board 40 is still outside the terminal box 24, as it is then more easily accessible. The terminal box cover 41, secured by an undetachable screw, about which it is pivotable, advantageously serves at the same time to accommodate a rating plate for the machine, together with connection circuit diagrams.

From the upper part of FIG. 5 it may be seen how the corners of the electric sheet which remain on the active material increase the former nominal yoke height $h_{jn}$ 42 in the diagonals to $h_{jeff}$ 43, the yoke induction in the diagonals being approximately halved. The greater the number of poles in the machine, the more the yoke induction is reduced. This leads to a reduction in the magnetization currents and iron losses, thus improving the power factors and efficiency in the case of rotary field machines, without involving the consumption of any greater quantity of electric sheet material in the stamping process than hitherto.

With machines which are not rotationally symmetrical, e.g. with D.C. and single-phase motors, it is more advantageous to retain the yoke height $h_{jn}$ on all sides but to utilize the closely hatched surfaces 44 and 45 in the lower half of FIG. 5 for the purpose of accommodating a greater quantity of winding copper.

In FIG. 6 the reference numerals 46, 47 and 48 denote the main poles with their windings while the reference numerals 49 and 50 denote the reversing poles. The relatively thin yoke 51 on the right-hand side of the separate stack in FIG. 6 conveys the losses over a short traject to the rib base, marked $D_a$, of the tangential cooling channels.

FIG. 7 shows how, in the case of surface-cooled single-phase motors, the main phase, requiring a greater quantity of copper, is advantageously accommodated in large diagonal grooves 52, 53, 54 and 55.

Figure 8:
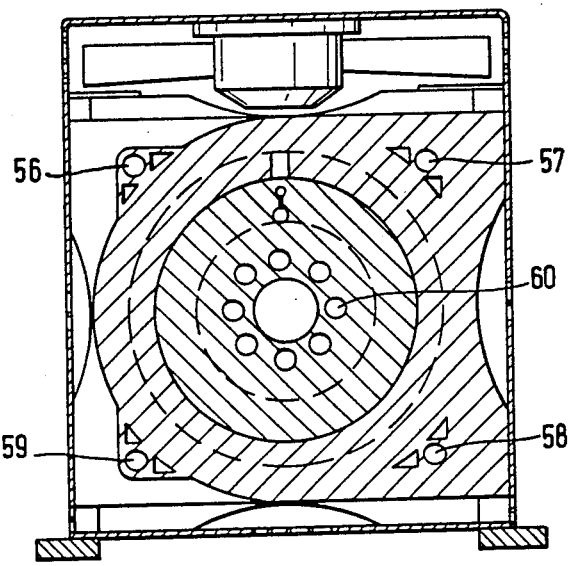
FIG. 8 is a representation similar to that shown in FIG. 6, but in the case of a large-size machine with additional internal-circuit cooling, according to the invention and shown in cross section.
Figure 9:
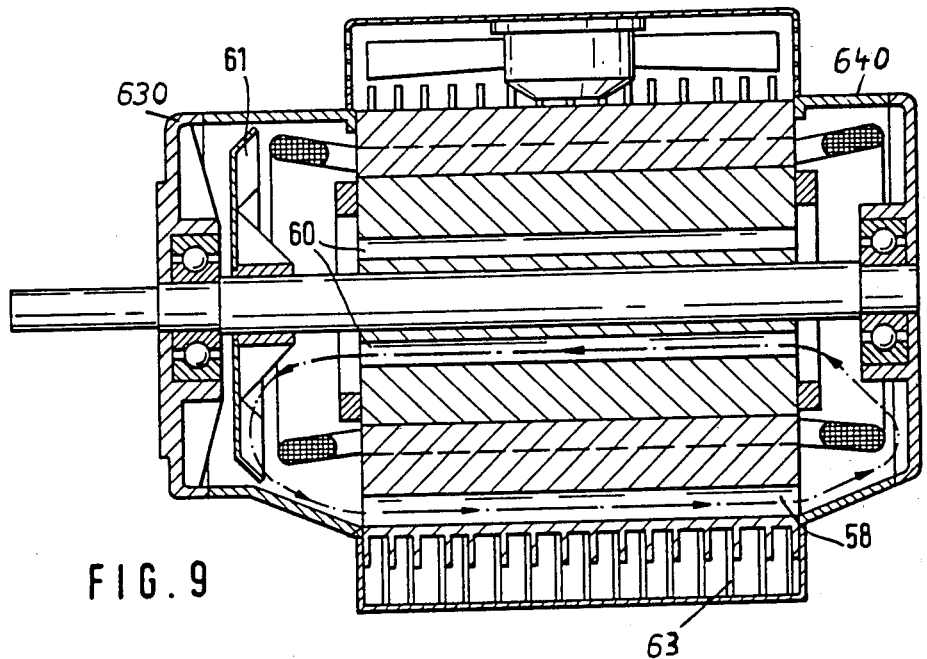
FIG. 9 is a representation similar to that shown in FIG. 8, but in longitudinal section.

With very large electrical machines the traject which the heat loss has to follow from the interior of the machine to the outside is frequently so long that the temperature gradient in the internal traject becomes too great for even the most efficient surface cooling to take effect. In such cases a remedy is provided by an additional cooling circuit for the interior. FIG. 8 shows axial channels 56, 57, 58 and 59 stamped into the diagonals of the stack. Similar channels may also be found in the rotor, where they take the form of perforations 60. One common current of air passes through the outer channels but in opposite directions. This effect is ensured, in FIG. 9, by an inner fan 61. The heat loss conveyed to the outer channels is distributed, by the large number of the tangential cooling ribs 63, over an ample surface, and is dissipated to the outer air by the external flow of cooling air. Large size machines built up on these lines can be produced more economically than the present machines provided with tubular cooling or liquid cooling systems.

Clamping bolts or die-casting cores exerting the same function, by which the stack of stator plates is held together as a compact unit, are accommodated in the axial channels 11, 12, 13 and 14.

Finally, pot-shaped bearing plates 630 and 640 centered on the ends of the stack of stator plates 15, 16 and 17 are provided for the transition from the box-shaped tangentially ribbed stack of stator plates to the bearing system of the machine shaft.

The invention may be embodied in other specific forms without departing from the spirit or essential characteristics thereof. The embodiments are therefore to be considered in all respects as illustrative and not restrictive.

What is claimed is:

1. An electrical machine comprising a stator having a cylindrical cavity extending therethrough; bearing means at opposite ends of said stator; a rotor in said cavity and mounted for rotation at opposite ends thereof in said bearing means; said stator comprising a plurality of stator plates having the same asymmetrical configuration and arranged in stacked relationship, each stator plate having a circular aperture therein of predetermined diameter, four secondary apertures arranged in a square configuration about said circular aperture, said secondary apertures being a predetermined distance from the perimeter of said circular aperture and the axes of said square configuration of said secondary apertures and of said circular aperture coinciding, a base edge spaced from one side of said circular aperture and from a pair of said secondary apertures, parallel side edges extending from opposite ends of said base edge, the distance of said side edges from each other being such that said side edges are a predetermined distance from the respective opposite sides of said circular aperture, and a top edge extending between said parallel side edges at the side of said circular aperture opposite said base edge, at least a major central portion of said top edge having a convex semicircular configuration concentric with and spaced a predetermined distance from the side of said circular aperture, said base edge having a central concave semicircular configuration complementary to said convex semicircular configuration of said top edge opposite said base edge and being spaced a greater distance from said one side of said circular aperture than said side and top edges; said stator plates of said stator being arranged in said stack with their circular apertures aligned to form said cylindrical cavity and with said stator plates arranged with their base edge sides offset from each other by 90° and multiples thereof about the axis of said cylindrical cavity such that said secondary apertures of said stator plates are aligned to form four axial channels in said stator equally spaced about said cylindrical cavity; and means securing said bearing means and stator with said stator plates in said stacked relationship whereby the portions of said stator plates adjacent said base edge project radially about said stator and are spaced from each other to provide tangential cooling ribs.

2. An electrical machine according to claim 1 wherein said means securing said stator plates in said stacked relationship extends through said axial channels.

3. An electrical machine according to claim 1 wherein the base edge sides of adjacent successive stator plates are offset from each other by 90° about said axis of said cylindrical cavity.

4. An electrical machine according to claim 1 further comprising a housing of substantially square configuration surrounding said stator, said housing including apertures therein, and fan means mounted on the interior of said housing for circulating air in a tangential direction between said cooling ribs and between the portions of said base edges having said central concave semicircular configuration and the interior of said housing and through said apertures in said housing.

5. An electrical machine according to claim 1 wherein said bearing means comprises bearing plates centered with respect to said cylindrical cavity at opposite ends of said stator.

6. An electrical machine according to claim 5 further comprising housing rings positioned at opposite ends of said stator and interposed between said bearing plates and said stator, each of said housing rings including feet for supporting said machine.

7. An electrical machine according to claim 6 further comprising a pressure ring disposed in each of said housing rings for pressing the ends of electrical coils against the internal surfaces of said housing rings.

* * * * *